US009818250B2

(12) United States Patent
Carroll et al.

(10) Patent No.: US 9,818,250 B2
(45) Date of Patent: Nov. 14, 2017

(54) METHODS AND SYSTEMS FOR CREATING VENDING MACHINE KITS

(71) Applicant: W.W. Grainger, Inc., Lake Forest, IL (US)

(72) Inventors: Thomas John Carroll, Lake Barrington, IL (US); Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 175 days.

(21) Appl. No.: 14/300,971

(22) Filed: Jun. 10, 2014

(65) Prior Publication Data

US 2015/0356809 A1 Dec. 10, 2015

(51) Int. Cl.
G07F 11/00 (2006.01)
G07F 11/70 (2006.01)

(52) U.S. Cl.
CPC ............ G07F 11/002 (2013.01); G07F 11/70 (2013.01)

(58) Field of Classification Search
CPC combination set(s) only.
See application file for complete search history.

(56) References Cited

U.S. PATENT DOCUMENTS

| 7,894,936 | B2* | 2/2011 | Walker | G06Q 10/087 700/236 |
| 2002/0032582 | A1* | 3/2002 | Feeney, Jr. | G06F 19/3462 705/2 |
| 2002/0096543 | A1* | 7/2002 | Juselius | A61J 7/0481 222/631 |
| 2002/0147526 | A1* | 10/2002 | Siegel | A61J 7/0481 700/237 |
| 2004/0249711 | A1* | 12/2004 | Walker | G06Q 10/06375 705/14.24 |
| 2005/0182678 | A1* | 8/2005 | Walker | G06Q 20/045 705/14.24 |
| 2005/0222919 | A1* | 10/2005 | Pellerin | G06Q 30/0641 705/27.1 |
| 2006/0247823 | A1* | 11/2006 | Boucher | G07F 5/18 700/241 |
| 2006/0259188 | A1* | 11/2006 | Berg | A61J 7/0084 700/231 |
| 2008/0054007 | A1* | 3/2008 | Mador | A61J 7/0481 221/1 |
| 2008/0103851 | A1* | 5/2008 | Walker | G06Q 10/087 705/28 |
| 2008/0198012 | A1* | 8/2008 | Kamen | A61M 5/14244 340/572.1 |
| 2008/0208787 | A1* | 8/2008 | Luchene | G06N 5/025 706/47 |

(Continued)

Primary Examiner — Gene Crawford
Assistant Examiner — Stephen Akridge
(74) Attorney, Agent, or Firm — Greenberg Traurig, LLP

(57) ABSTRACT

A system and method for dispensing a kit of items from one or more vending machines includes a kit determination system with a kit analyzer to determine whether there is a specific kit or kits to recommend or assign to a user. A kit may be pre-assigned to the user by a third party. If there is no kit assigned to the user, a kit may be recommended to the user based on past history and a number of other factors. Also included is a vending machine kit dispensing system for dispensing a kit of items from one or more vending machines, the vending machines being interconnected on a network.

16 Claims, 5 Drawing Sheets

(56) References Cited

U.S. PATENT DOCUMENTS

| | | | |
|---|---|---|---|
| 2009/0030797 A1* | 1/2009 | Otto | G06Q 10/087 |
| | | | 705/14.25 |
| 2009/0306817 A1* | 12/2009 | Antao | G07F 11/002 |
| | | | 700/231 |
| 2010/0256808 A1* | 10/2010 | Hui | G07F 7/025 |
| | | | 700/225 |
| 2010/0305749 A1* | 12/2010 | Coe | A61J 7/0481 |
| | | | 700/231 |
| 2013/0253700 A1* | 9/2013 | Carson | G07F 9/006 |
| | | | 700/236 |
| 2014/0335490 A1* | 11/2014 | Baarman | A61B 5/002 |
| | | | 434/236 |
| 2015/0347713 A1* | 12/2015 | Seeger | A61J 7/0418 |
| | | | 700/236 |

* cited by examiner

METHODS AND SYSTEMS FOR CREATING VENDING MACHINE KITS

FIELD OF THE DISCLOSURE

The present description relates generally to vending systems and more particularly to methods and systems for creating vending machine kits.

BACKGROUND OF RELATED ART

A vending machine generally is a controlled inventory storage device or cabinet that allows inventory to be securely stored and dispensed near a point-of-sale and/or point-of-use. The use of vending machines for providing various products, such as soft drinks or snacks, is well known. Typical vending machines provide for a plurality of receptacles (e.g. rows, trays, or columns) for holding units of products, and a dispensing mechanism operable to dispense a product from each receptacle.

A vending machine typically holds a finite number of units of products. The vending machine is typically loaded with a number of units of a variety of different products. For example, a first tray may be loaded with a plurality of units of a first product while a second tray may be loaded with a plurality of units of a second product. Currently, in known applications, users are required to request items from the vending machine individually. Specifically, to date, there are no known vending machine inventory solutions that recognize groups of products that are requested and commonly used together, and which should dispense together automatically. Therefore, it would be advantageous for a vending machine user to be able to automatically receive groups of products that are requested and commonly used together.

DETAILED DESCRIPTION

The following description of example methods and systems is not intended to limit the scope of the description to the precise form or forms detailed herein. Instead the following description is intended to be illustrative so that others may follow its teachings.

The vending machine kit dispensing system of the present disclosure provides a system for automatically dispensing a group of products required by or assigned to a user. In one example, the kit dispensing system allows a user to input a list of items to be dispensed together as a kit. The system will then automatically dispense the items in the list from one or more vending machines.

In another example of the kit dispensing system, the kit dispensing system may recommend a plurality of kits to the user based on the user's identity and/or one or more pieces of relevant information (e.g. time of day, month, weather, etc.). The kit dispensing system will then automatically dispense the user-selected kit from one or more vending machines. For example, if a user typically requests a kit containing a warmer glove and disposable earplugs when the temperature is below 40 degrees, the kit dispensing system will automatically recommend a kit containing those items when the temperature is below 40 degrees.

In another example of the kit dispensing system, the kit dispensing system will automatically provide the user with a predefined kit based on the user's identity or the user's identity together with another factor (e.g. time of day, day of week, etc.). The kit dispensing system will then automatically dispense the kit from one or more vending machines. For example, a kit on Monday for prepping a machine may contain items a, b and c. On Friday, for cleaning purposes, the kit might have items a, b and d; item d being a new respirator filter that is not needed during prepping on Mondays, but is needed for cleaning on Fridays. The kit dispensing system will automatically assign the user a kit containing items a, b, and c on Mondays, and will automatically assign a kit containing items a, b, and d on Fridays.

Figure 1:
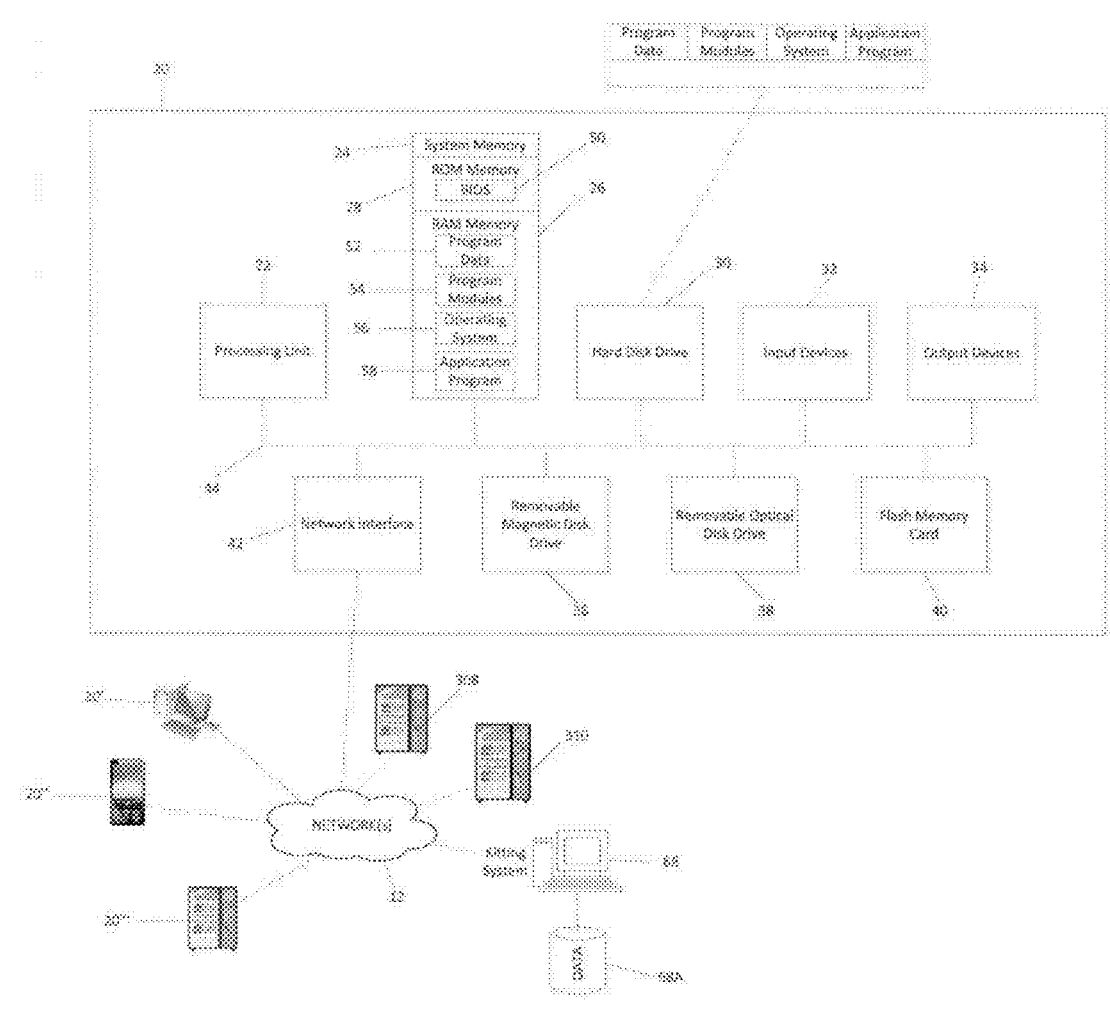
FIG. 1 illustrates in block diagram form components of an example computer network environment suitable for implementing the example vending machine kit dispensing methods and systems disclosed.

Referring now to FIG. 1, there is shown a processing device 20 illustrated in schematic form. The processing device 20 may be provided with executable instructions to, for example, provide a means for a user to interact with a vending machine. Generally, the computer executable instructions reside in program modules which may include routines, programs, objects, components, data structures, etc. that perform particular tasks or implement particular abstract data types. FIG. 1 also illustrates a processing device 20' illustrated in the exemplary form of a computer system, a processing device 20" illustrated in the exemplary form of a mobile communication device, and a processing device 20''' illustrated in the exemplary form of a vending machine. Those of ordinary skill in the art will appreciate that the processing devices 20, 20', 20", 20''' illustrated in FIG. 1 may be embodied in any device specifically adopted and/or configured to execute systems and/or methods in accordance with the example disclosed herein. The example device may include a device having the ability to execute instructions, such as, by way of example, an appliance, a personal computer, a mainframe computer, a mobile device, a personal-digital assistant ("PDA"), a cellular telephone, a tablet computer, an ereader, or the like. Furthermore, those of ordinary skill in the art will appreciate that the various tasks described hereinafter may be practiced on a single processing device or in a distributed environment having multiple processing devices linked via a network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 44. Without limitation, the bus 44 may be a memory bus, a peripheral bus, and/or a local bus using any of a variety of bus architectures. Processing unit 22 may be any type of processing unit for executing software instructions, but will conventionally be a microprocessor device. As needed for any particular purpose, the system memory 24 may include read only memory ("ROM") 28 and/or random access memory ("RAM") 26.

As will be appreciated by those of ordinary skill in the art, both ROM 28 and RAM 26 may store executable instructions to be executed by the processing unit 22.

Processing unit 22 and system memory 24 may also be connected, either directly or indirectly, through a bus 44 or alternate communication structure to one or more peripheral devices. For example, processing unit 22 or system memory 24 may be directly or indirectly connected to additional memory storage, such as a hard disk drive 30, a removable optical disk drive 38, a removable magnetic disk drive 36, and a flash memory card 40. The drive interfaces and their associated computer-readable media allow for the non-volatile storage of computer readable instructions, data structures, program modules, and other data for the processing device 20. Those of ordinary skill in the art will further appreciate that other types of non-transitory computer-readable media that can store data and/or instructions may be used for this same purpose.

A number of program modules may be stored in one or more of the memory/media devices. For example, a basic input/output system ("BIOS") 50, containing the basic routines that help to transfer information between elements within the processing device 20, such as during start-up, may be stored in ROM 28. Similarly, the RAM 26, hard drive 30, and/or peripheral memory devices may be used to store computer executable instructions comprising an operating system 56, one or more application programs 58 (such as a Web browser), other program modules 54, and/or program data 52. Still further, computer-executable instructions may be downloaded to one or more of the memory devices as needed, for example via a network connection.

Processing unit 22 and system memory 24 may also be directly or indirectly connected to one or more input devices 32 and one or more output devices 34. Input devices 32 may include a keyboard, touch screen, a point device (e.g. a mouse or touchpad), RFID detector, PIN pad, or any other suitable device. Input devices 32 may be connected to the processing unit 22 using interfaces such as, for example, a parallel port, game port, firewire, or a universal serial bus ("USB"). Output devices 34 may include, for example, a monitor display, an integrated display, or a television.

Processing unit 22 may be directly or indirectly connected to one or more network interfaces 42 for communicating with a network 12. The example network interface 42, also sometimes referred to as a network adapter or network interface card ("NIC"), translates data and control signals from processing unit 22 into network messages according to one or more communication protocols, such as the Transmission Control Protocol ("TCP"), the Internet Protocol ("IP"), and the User Datagram Protocol ("UDP"). These protocols are well known in the art. A network interface 42 may employ any suitable connection agent for connecting to the network 12, including, for example, a wireless transceiver, a power line adapter, a modem, or an Ethernet connection.

It should be appreciated that a processing device employed according to the various examples of the present disclosure may include more components than processing device 20 illustrated in FIG. 1, fewer components than processing device 22, or a different combination of components than processing device 22. Some implementations of the present disclosure, for example, may employ one or more processing devices that are intended to have a very specific functionality, such as a server computer or cellular telephone. These processing devices may thus omit unnecessary peripherals, such as an optical disk drive 38, external hard drive, etc. Some implementations of the present disclosure may alternately or additionally employ processing devices that are intended to be capable of a wide variety of functions, such as a desktop or laptop personal computer. These processing devices may have any combination of peripheral devices or additional components as desired.

As noted, the processing device 20 may also utilize logical connections via the network 12 to one or more remote processing devices, such as a cellular telephone 20", a personal computer 20', other vending machines 20''', 308, 310, or a kitting system server 68 having associated user database 68A. In this example, the kitting system server 68 may act as a kit assignment or recommendation system as described herein. While the example kitting system server 68 has been illustrated in the form of a computer, it will be appreciated that the kitting system server 68 may, like processing device 20, be any type of suitably purposed device having processing capabilities. Again, it will be appreciated that the kitting system server 68 need not be implemented as a single device but may be implemented in a manner such that the tasks performed by the kitting system server 68 are distributed amongst a plurality of processing devices/databases located at the same and/or at different geographical locations and linked through a communication network (e.g. a local or wide area network). Additionally, the kitting system server 68 may have logical connections to other third party systems via the network 12 such as, for example, the Internet, LAN, WAN, cellular network, cloud network, Bluetooth, near field communication, wired and/or wireless network, or other suitable network, and via such connections, will be associated with data repositories that are associated with such other third party systems. Even further, while the server 68 is illustrated as being remotely located from the processing device 20, it will be understood that the server 68 may be partially and/or wholly provided local to the device and may be accessible with or without requiring the network 12.

For performing tasks as needed, the kitting system server 68 may include any or all of the elements described above relative to the processing device 20. In addition, the disclosed kitting system server 68 generally included executable instructions for, among other things, querying the user database 68A; storing and/or retrieving kit recommendations or assignments; storing, retrieving, and/or updating data associated with a particular user; and providing a kit recommendation service based on stored associated user data.

Figure 2:
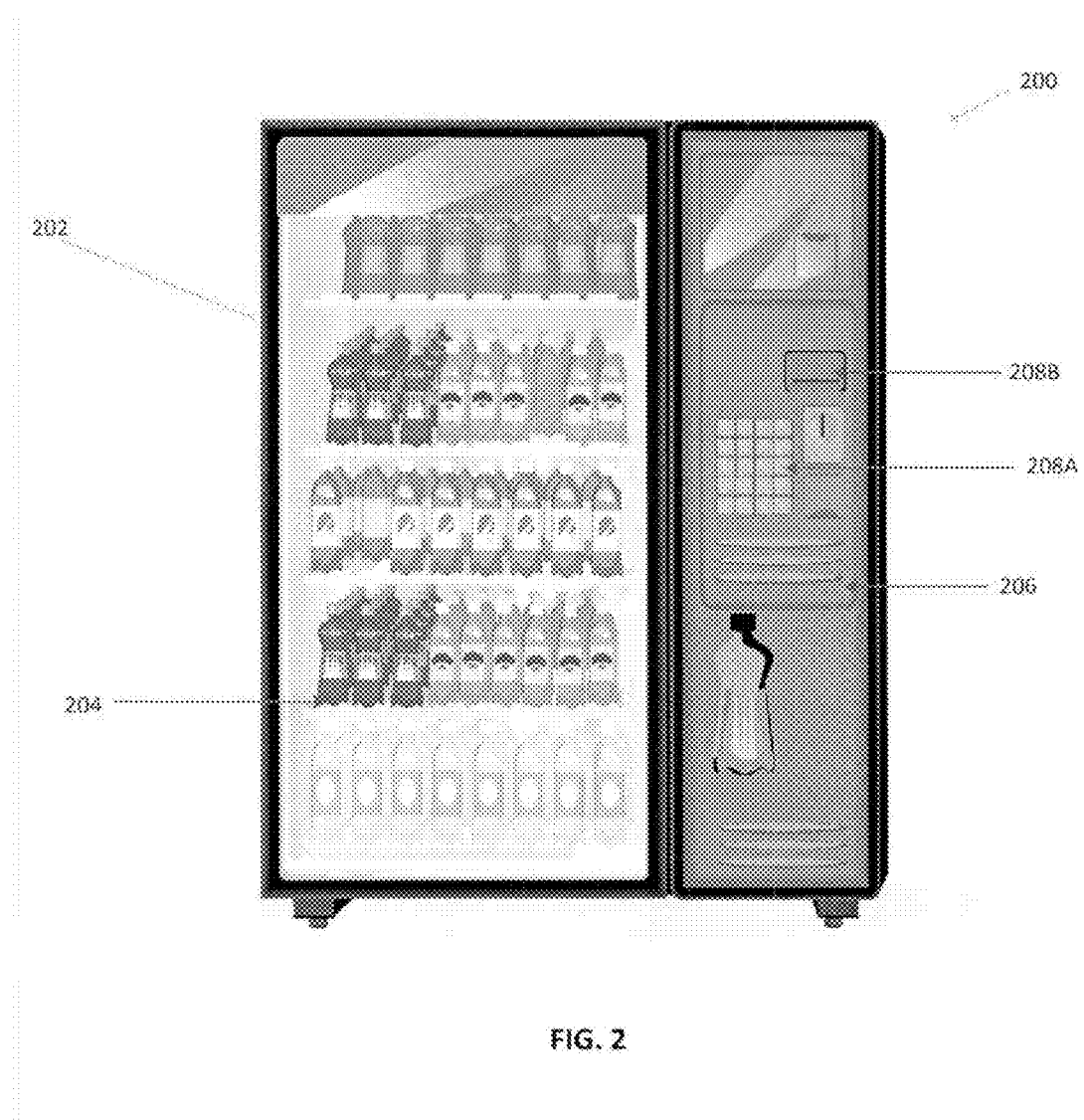
FIG. 2 is a perspective view of an example vending machine which may dispense kits with an example vending machine kit dispensing system of the present disclosure

Referring now to FIG. 2, an example vending machine 200 is illustrated. The example vending machine 200 may be of any type of suitable vending machine, including, for example, a carousel, coil, door, or any other suitable design and/or combination of designs. One of ordinary skill in the art will appreciate that there are many ways to dispense kits, depending on the type of design used. For instance, if a carousel design is used, an indicator and/or other device can alert the user that the carousel will automatically advance in order to dispense the next item in that same carousel. If a door design is used, multiple doors can unlock simultaneously. If a coil design is used, multiple coils can wind simultaneously.

The illustrated example vending machine 200 is a point-of-use located secured dispenser including a housing 202 and means for delivering goods such as a plurality of vending mechanisms 204. The vending mechanisms 204 may include helical coil delivery devices, carousels, drawers, doors, robotic delivery devices, other suitable devices, or any combination thereof. The vending machine 200 also typically includes a delivery controller 206 for controlling the delivery of items, such as tools or food. The example delivery controller 206 includes a user interface for entering data, consisting of an input device 208A and a display 208B. The input device 208A may be used to identify the user of the vending machine by, for example, entering an identification code, or may be used to select a kit from a list of recommended kits. Additionally, the user interface may include a user identification device (not shown) for identifying the user of the vending machine. The user identification device may be, for example, a PIN pad, a card swiping mechanism, an RFID tag reader, facial recognition device, finger print recognition device, or any other suitable device. The delivery controller 206 is typically coupled to a processor, so that the vending machine 200 may function as a processing device. Furthermore, delivery controller 206 may be directly or indirectly connected to one or more network interfaces 42 for communicating with the network 12.

Figure 3:
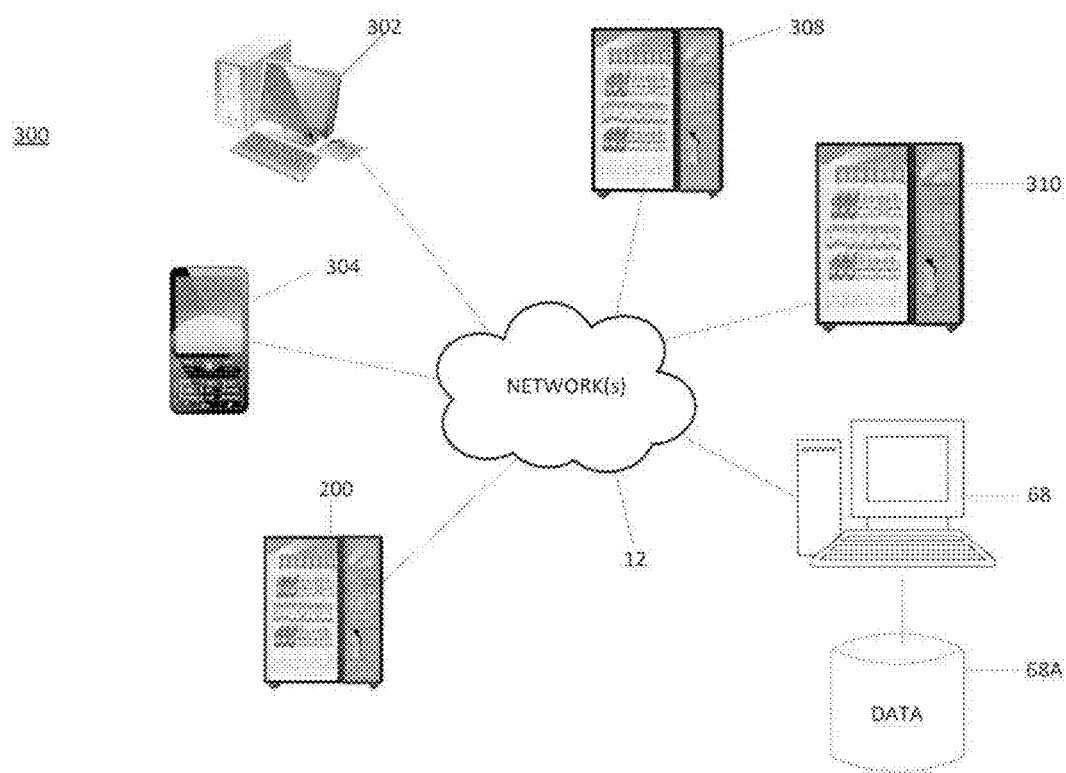
FIG. 3 illustrates a block diagram of one example vending machine kit dispensing system in which a kit of items may be dispensed from one or more vending machines.

Referring to FIG. 3, there is illustrated an example vending machine kit dispensing system 300. As illustrated, in the example system 300, a user may initiate vending machine kit dispensing through any processing device, such as a computer 302, a mobile device 304, the vending machine 200, or any other suitable known or yet to be developed device. In one example of utilization, the kit dispensing system 300 includes electronic access to the kitting system server 68 through, for example, the network 12. As previously noted, while the server 68 is illustrated as being remotely located from the processing devices 302, 304, 200, it will be understood that the server 68 may be partially and/or wholly provided local to the device and may be accessible with or without requiring the network 12. As noted above, the server 68 may provide the kit dispensing system 300 with access to the user database 68A, which in this example is a repository of user data including, for example, user identification, user role, time of day, month, year, weather, or other suitable data. The server 68 may utilize the data to recommend or assign a kit as detailed below. Once a kit is recommended or assigned, the system 300 may provide the recommendation or assignment to the processing device 20. The processing device 20 may then direct kit items to be dispensed from one or more vending machines 200, 308, 310. In one example of the current disclosure, a remote processing device controlled by a third party, such as a personal computer 302 or cellular telephone 304, may directly assign or recommend a kit to the point-of-use vending machine 200 via the network 12. Such an example may be desirable, for instance, when a kit requires supervisor approval, the supervisor being remotely located.

The vending machine kit dispensing system 300 may also facilitate interaction between multiple vending machines 200, 308, 310 via the network 12. In one example of the current present disclosure, any of the vending machines 200, 308, 310 connected via the network 12 may be used to dispense any of the items contained in the kit. For instance, if point-of-use vending machine 200 is out-of-stock of one or more items in the kit, the system 300 may recommend that user obtain the out-of-stock item(s) at a different machine 308, 310, or the system 300 may automatically dispense the out-of-stock item(s) from a different machine 308, 310. Still further, the system 300 may recommend a substitute or alternative product if the base item is out-of-stock, discontinued, recalled, back ordered, upgraded, updated, replaced, or the like.

Figure 4:
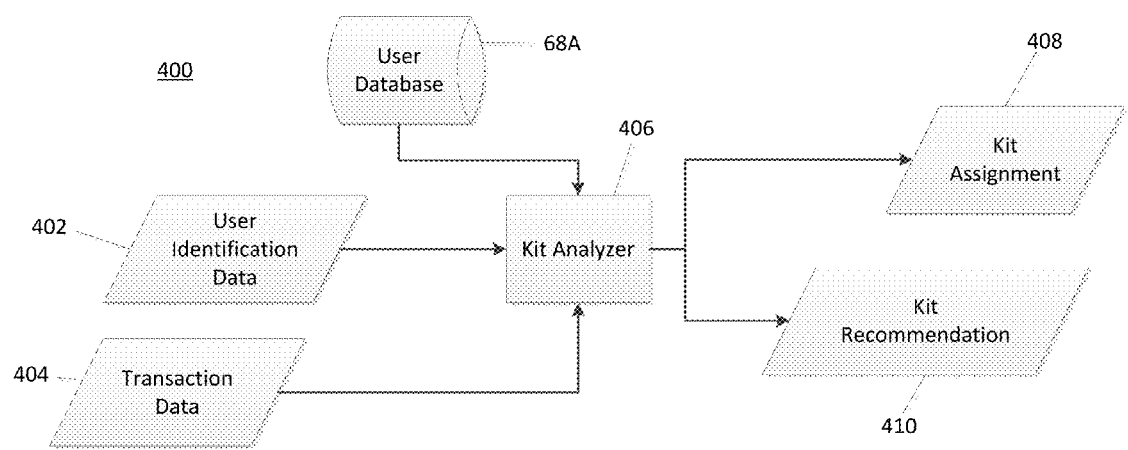
FIG. 4 illustrates in flowchart form an example system for kit determination.

Referring to FIG. 4, there is illustrated a system for kit determination 400, showing process steps within the kit determination system 400 having a kit analyzer 406. The kit determination system 400 includes relevant transaction data 404 received from one or more processing devices logically linked to the kit determination system 400, such as via the network 12. Examples include, but are not limited to, user role, time of day, month, year, and weather. The kit determination system 400 also includes user identification data 402 received from one or more processing devices logically linked to the kit determination system 400, such as via the network 12. The user may be identified, for example, by entering a PIN code, scanning their finger on a fingerprint reader, swiping an identification card, or any other suitable method. One of ordinary skill in the art will recognize that there are many other ways to identify a user that are not listed here.

The kit analyzer 406 takes as input the relevant transaction data 404, the user identification data 402, and the user database 68A to produce either a kit assignment 408 or a kit recommendation 410. In this example, the user database 68A is a database containing past usage data related to vending machine users. Past usage data may include pre-defined kit assignments and/or past user transactions together with the relevant transaction data (i.e. time of day, month, year, weather, etc.) associated with the past user transactions. The user database 68A is used by the kit analyzer 406 to make at least one of a kit recommendation 410 or a kit assignment 408.

The kit recommendation 410 is an output produced by the kit analyzer 406 that is sent to the user as a list of recommended kits. For instance, in one example, if a user typically requests a kit containing a warmer glove and disposable earplugs when the temperature is below 40 degrees, the kit analyzer 406 may automatically output a kit recommendation 410 containing those items when the temperature is below 40 degrees. The kit assignment 408 is an output produced by the kit analyzer 406 that is sent to one or more vending machines as a kit to be automatically dispensed. For instance, in one example, the kit analyzer 406 receives as an input from the user database 68A a pre-defined kit definition containing items a, b, and c. The kit analyzer 406 will automatically output a kit assignment 408 of items a, b, and c to be dispensed from one or more vending machines.

Figure 5:
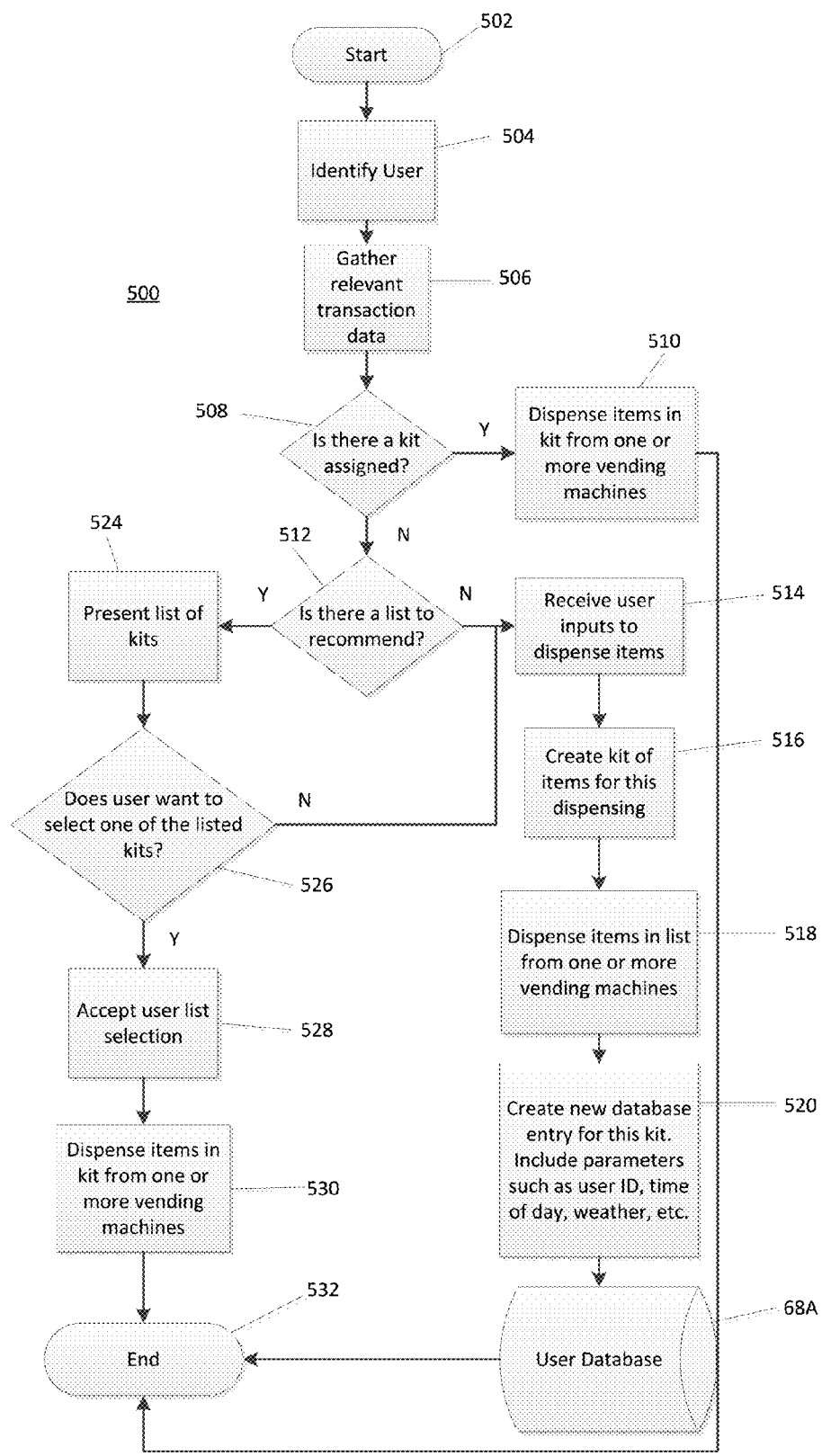
FIG. 5 illustrates in flowchart form an example process for automatically dispensing a kit from one or more vending machines utilizing the example kit determination system and the example vending machine kit dispensing system.

Referring to FIG. 5, there is illustrated a flow chart of one example process 500 for automatically dispensing a kit from one or more vending machines, which may be implemented by the example kit determination system 400 in conjunction with the example vending machine kit dispensing system 300. In the illustrated example, the process is entered at a block 502 and proceeds to a block 504 for user identification. The user may be identified, for example, by entering a PIN code or swiping an ID card. Once the user is identified, the process proceeds to a block 506 for gathering relevant transaction data. Relevant transaction data may include, but is not limited to, user role, time of day, month, year, weather, etc.

Once user identification and relevant transaction data have been gathered, at a block 508, the kit determination system 400 will determine whether a kit has been assigned to the user. If a kit has been assigned, the process will proceed to a block 510 to dispense kit items from one or more vending machines using the vending machine kit dispensing system 300. The process will then proceed to process end at a block 532. If at the block 508 the kit determination system 400 determines that a kit has not been assigned, process will proceed to a block 512 where the kit determination system 400 will determine whether there is a list of kits to recommend.

If the kit determination system 400 determines that there is a list of kits to recommend, the process proceeds to a block 524 to present the list of kits to the user. The process then proceeds to a block 526 to determine if the user wants to select one of the listed kits. If the user does not want to select one of the listed kits, process proceeds to a block 514 to receive user inputs to dispense items.

Returning to the block 512, if there is no list of kits to recommend, the process will proceed to a block 514 to receive user inputs to dispense items. The process will then proceed to a block 516 to create a kit of items for this dispensing based on the user inputs to dispense items. Process will next proceed to a block 518 to dispense kit items from one or more vending machines using the vending machine kit dispensing system 300. Once the kit has been dispensed, the process will proceed to a block 520 to create a new database entry for this kit. The new database entry may contain a number of parameters, including, but not limited to, user ID, time of day, weather, etc. The process next proceeds to store the database entry for this kit in the user database 68A. The process will then proceed to process end at a block 532.

Returning to the block 526, if the user does want to select one of the listed kits, the process proceeds to a block 528 to accept the user list selection. The process will next proceed to a block 530 to dispense the kit items from one or more vending machines using the vending machine kit dispensing system 300. The process will then proceed to process end at the block 532.

It will be further appreciated that the vending machine kit dispensing system 300 may provide additional enhancements and/or features as desired. For example, in at least one instance, any one of the vending machines 200, 308, 310 in the system 300 may be provided with any suitable inventory tracking device and/or system, including, for instance, a sensor-based inventory control to track inventory levels, usage levels, item returns, etc. in the vending machines 200, 308, 310 during use. In this instance, the vending machines 200, 308, 310 may then provide real-time, near real-time, and/or batch updated inventory data to the kitting system server 68, and the system 300 may utilize the provided inventory data to, for example, determine whether one or more kit items are out-of-stock, and whether the items are available in a different vending machine. Additionally, the vending machines 200, 308, 310 in the system 300 may be provided with any relevant transaction data collection devices and/or systems, including, for example, a clock to determine time of day, month, and year; and a sensor-based weather detector to track temperature, wind speed, precipitation, etc.

It will also be appreciated that the methods and systems for creating vending machines kits disclosed herein have a wide range of applicability, such as dispensing equipment at a job site, dispensing food in the consumer space, etc. For example, in the consumer space, a kit containing special food items may be recommended based on the user's food preferences (e.g. gluten free, kosher, low calorie, etc.). For customers at an airport, for example, flyers with high mileage status might be assigned premium food or liquor items in the kits they receive before boarding. It will be appreciated by one of ordinary skill in the art that there are many other ways to apply the present disclosure besides those listed here.

Although certain example methods and systems have been described herein, the scope of coverage of this patent is not limited thereto. On the contrary, this patent covers all methods, systems, and articles of manufacture fairly falling within the scope of the appended claims either literally or under the doctrine of equivalents.

We claim:

1. A method for automatically dispensing a kit of items from a vending machine comprising:

programming a time based product dispensing feature of the vending machine by capturing an identifier for a user that is received by the vending machine at a first point in time, first data indicative a plurality of products that were caused to be dispensed from the vending machine by the identified user at the first point in time, and second data indicative of at least one time parameter associated with the first point in time whereby, in response to the vending machine receiving the identifier for the user at a second point in time subsequent to the first point in time, the programmed, time based product dispensing feature functions to determine if the at least one time parameter associated with the first point in time corresponds to at least one time parameter associated with the second point in time and to cause the vending machine to automatically output a recommendation that the identified user cause the vending machine to dispense the plurality of products that were previously caused to be dispensed from the vending machine by the identified user at the first point in time when the at least one time parameter associated with the first point in time is determined to correspond to the at least one time parameter associated with the second point in time;

subsequent to causing the recommendation to be output to the identified user, receiving via an input device of the vending machine an instruction from the identified user to cause the vending machine to dispense one or more products other than the recommended plurality of products from the vending machine; and causing the vending machine to dispense the one or more products other than the recommended first plurality of products.

2. The method as recited in claim 1, wherein the at least one time parameter associated with the first point in time comprises a day of week.

3. The method as recited in claim 1, wherein the at least one time parameter associated with the first point in time comprises an hour of day.

4. The method as recited in claim 1, wherein the at least one time parameter associated with the first point in time comprises a day of month.

5. A system for automatically dispensing a kit of items from a vending machine, comprising:

a vending machine containing vending mechanisms stocked with a plurality of different types of items having a time based product dispensing feature, wherein the time based product dispensing feature is programmed by capturing an identifier for a user that is received by the vending machine at a first point in time, first data indicative of a first plurality of products that were caused to be dispensed from the vending machine by the identified user at the first point in time, and second data indicative of at least one time parameter associated with the first point in time whereby, in response to the vending machine receiving the identifier for the user at a second point in time subsequent to the first point in time, the programmed, time based product dispensing feature functions to determine if the at least one time parameter associated with the first point in time corresponds to at least one time parameter associated with the second point in time and to cause the vending machine to automatically output a recommendation that the identified user cause the vending machine to dispense the first plurality of products that were previously caused to be dispensed from the vending machine by the identified user at the first point in time when the at least one time parameter associated with the first point in time is determined to correspond to the at least one time parameter associated with the second point in time and to program the time based product dispensing feature with third data indicative of a second plurality of products that were caused to be dispensed from the vending machine by the identified user at the second point in time when the identified user is determined to have caused the vending machine to dispense the second plurality of product in lieu of the recommended first plurality of product.

6. The system as recited in claim 5, wherein the vending machine comprises a keypad for receiving the identifier for the user.

7. The system as recited in claim 5, wherein the vending machine comprises a device for receiving the identifier for the user from a machine readable element encoded with the identifier for the user.

8. The system as recited in claim 5, wherein the time based product dispensing feature comprises programming executable by a processing device disposed within the vending machine.

9. The system as recited in claim 5, wherein the time based product dispensing feature comprises programming executable by a server device in communication with the vending machine.

10. The method as recited in claim 5, wherein the at least one time parameter associated with the first point in time comprises a day of week.

11. The method as recited in claim 5, wherein the at least one time parameter associated with the first point in time comprises an hour of day.

12. The method as recited in claim 5, wherein the at least one time parameter associated with the first point in time comprises a day of month.

13. A non-transitory, computer readable media having instructions, executable by a processing device associated with a vending machine, for automatically dispensing a kit of items from the vending machine, the instructions performing steps comprising:

programming a time based product dispensing feature of the vending machine by capturing an identifier for a user that is received by the vending machine at a first point in time, first data indicative of a plurality of products that were caused to be dispensed from the vending machine by the identified user at the first point in time, and second data indicative of at least one time parameter associated with the first point in time whereby, in response to the vending machine receiving the identifier for the user at a second point in time subsequent to the first point in time, the programmed, time based product dispensing feature functions to determine if the at least one time parameter associated with the first point in time corresponds to at least one time parameter associated with the second point in time and to cause the vending machine to automatically output a recommendation that the identified user cause the vending machine to dispense the plurality of products that were previously caused to be dispensed from the vending machine by the identified user at the first point in time when the at least one time parameter associated with the first point in time is determined to correspond to the at least one time parameter associated with the second point in time;

subsequent to causing the recommendation to be output to the identified user, receiving via an input device of the vending machine an instruction from the identified user to cause the vending machine to dispense one or more products other than the recommended plurality of products from the vending machine; and causing the vending machine to dispense the one or more products other than the recommended first plurality of products.

14. The non-transitory, computer readable media as recited in claim 13, wherein the at least one time parameter associated with the first point in time comprises a day of week.

15. The non-transitory, computer readable media as recited in claim 13, wherein the at least one time parameter associated with the first point in time comprises an hour of day.

16. The non-transitory, computer readable media as recited in claim 13, wherein the at least one time parameter associated with the first point in time comprises a day of month.

* * * * *